July 8, 1952　　　　W. R. BECK　　　　2,602,518
DRIVEN DIRIGIBLE WHEEL MOUNTING FOR COAL MINE HAULAGE VEHICLES
Original Filed June 4, 1945　　　　　　　　　3 Sheets-Sheet 1

July 8, 1952 W. R. BECK 2,602,518
DRIVEN DIRIGIBLE WHEEL MOUNTING FOR COAL MINE HAULAGE VEHICLES
Original Filed June 4, 1945 3 Sheets-Sheet 2

INVENTOR.
William R. Beck
BY
Clarence F. Poole
ATTORNEY

July 8, 1952  W. R. BECK  2,602,518
DRIVEN DIRIGIBLE WHEEL MOUNTING FOR COAL MINE HAULAGE VEHICLES
Original Filed June 4, 1945  3 Sheets-Sheet 3

INVENTOR.
William R. Beck
BY Clarence F. Poole
ATTORNEY

Patented July 8, 1952

2,602,518

UNITED STATES PATENT OFFICE 2,602,518

DRIVEN DIRIGIBLE WHEEL MOUNTING FOR COAL MINE HAULAGE VEHICLES

William R. Beck, Chicago, Ill., assignor to Goodman Manufacturing Company, Chicago, Ill., a corporation of Illinois Original application June 4, 1945, Serial No. 597,547. Divided and this application August 30, 1947, Serial No. 771,412

3 Claims. (Cl. 180—43)

This invention relates to improvements in coal mine haulage vehicles of the kind used for transporting coal underground from the working face of a mine to a main loading station thereof.

This application is a division of application Serial No. 597,547, filed on June 4, 1945, and since issued as Patent Number 2,488,520, dated November 22, 1949.

The principal object of the invention is to provide a slow speed large capacity haulage vehicle for transporting coal in mines underground, having an improved transverse equalizing mounting for the front wheels of the vehicle, to take care of irregularities in the ground, and mounting said wheels for movement in opposite directions in substantially straight line vertical paths.

This and other objects of my invention will more clearly appear from time to time as the following specification proceeds and with reference to the accompanying drawings wherein.

Figure 3:
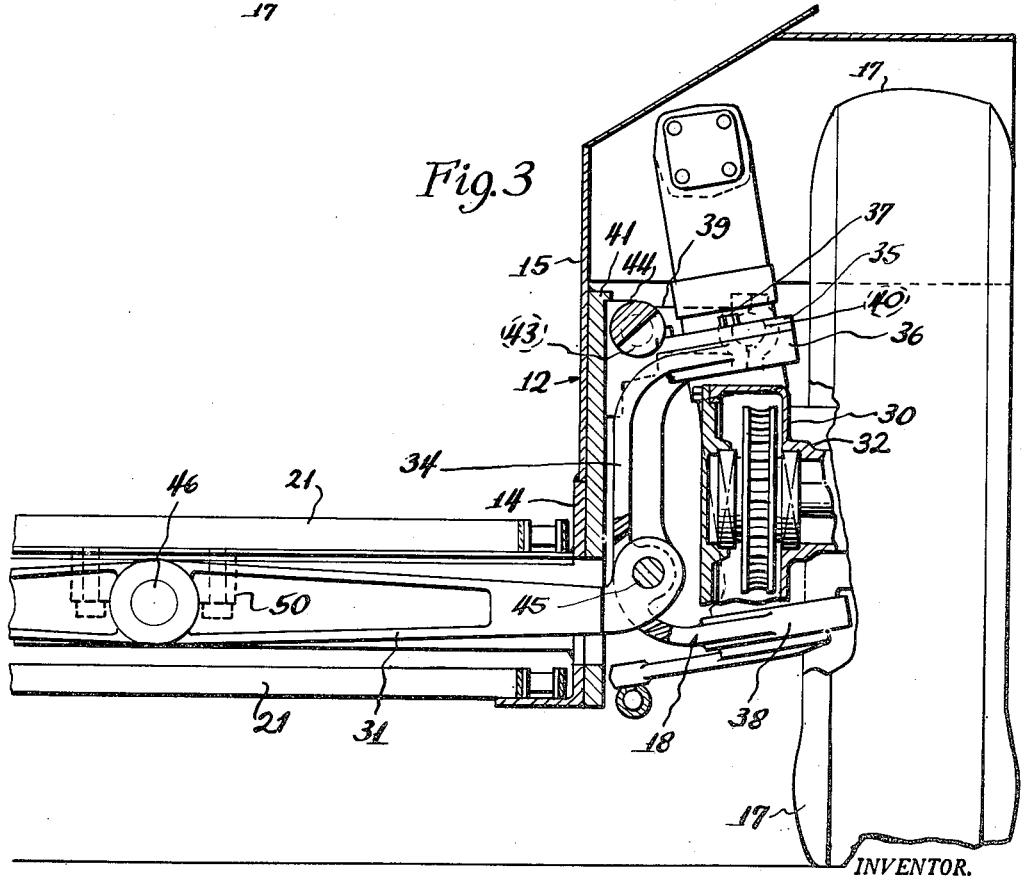
Figure 3 is a fragmentary sectional view taken substantially along line 3—3 of Figure 1.
Figure 4:
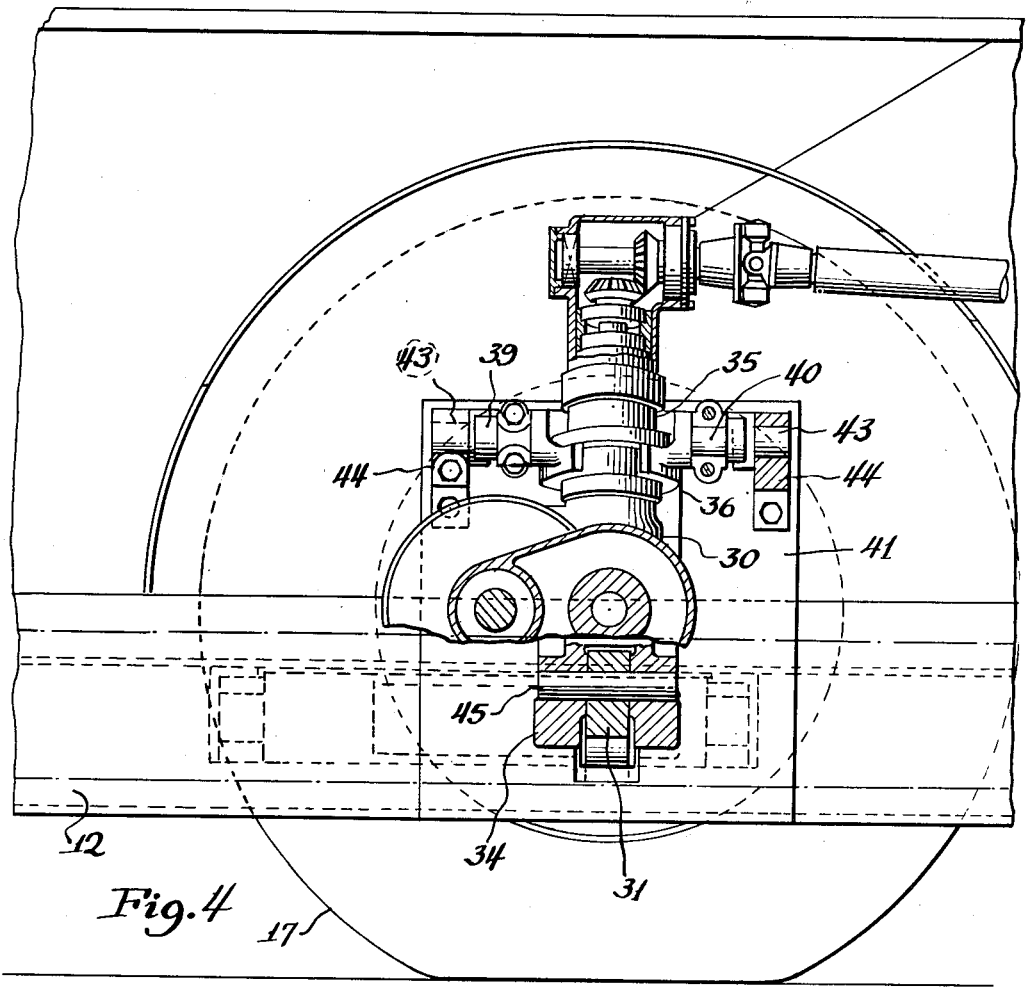
Figure 4 is a fragmentary sectional view taken substantially along line 4—4 of Figure 1.
Figure 5:
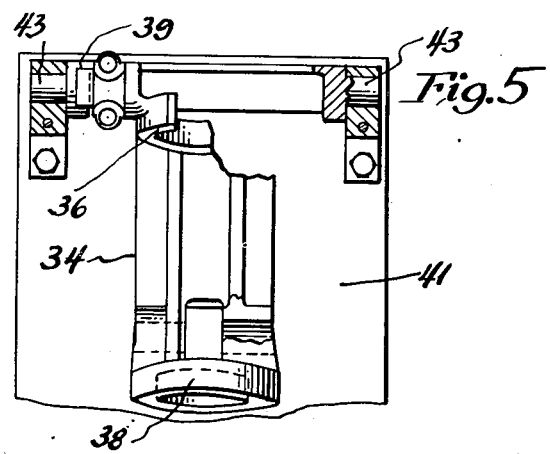
Figure 5 is an enlarged detail fragmentary side view showing certain details of the support mounting for one of the front vehicle wheels.

Referring now to the details of the embodiment of my invention illustrated in the drawings, the vehicle comprises an elongated chassis including a pair of vertically disposed laterally spaced side walls 12, 12 extending the full length thereof and forming the side walls of a coal carrying compartment thereof. Each of said side walls forms a supporting side beam for the vehicle and consists generally in a relatively heavy plate 14 forming the lower portion thereof, with a lighter plate 15 welded thereto and extending upwardly therefrom, as shown in Figure 3.

The vehicle has two front rubber tired driving and steering wheels 17, 17 near its front end, mounted on pivotal equalizing axle structures 18, 18. Two rear rubber tired driving and steering wheels 19, 19 are disposed near the rear end of the vehicle and are mounted on pivotal axle structures 20, 20.

Figure 1:
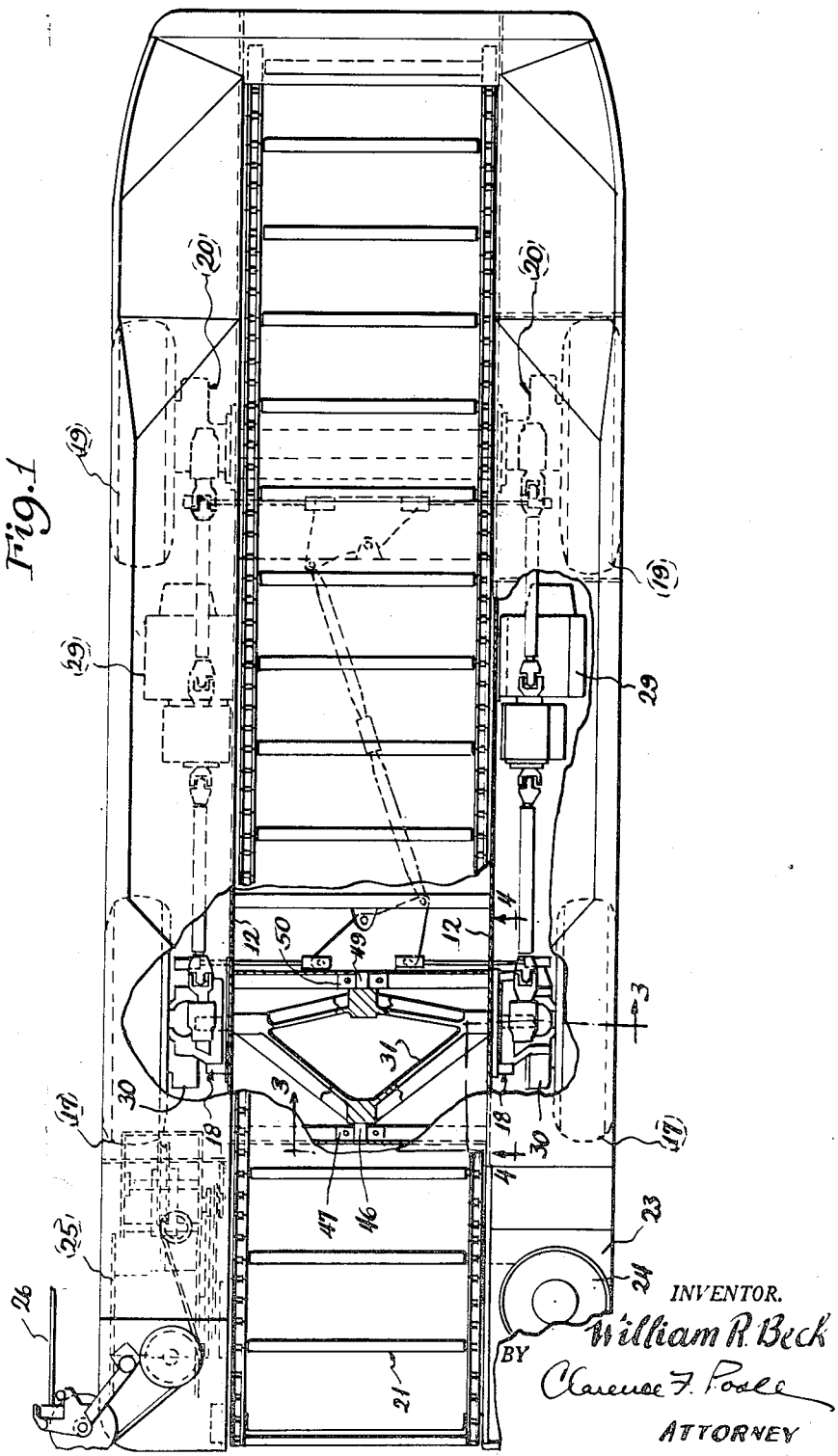
Figure 1 is a top plan view of a vehicle constructed in accordance with my invention.

An endless chain flight conveyor indicated generally at 21 extends along the vehicle for its full length and forms the bottom of the coal carrying compartment thereof, so that the coal can be progressed towards the discharge or front end of the vehicle during the loading operation, and can be unloaded mechanically from the discharge end of the vehicle, in the usual manner. An operator's platform 23 bearing the usual vehicle control devices including a steering wheel 24, is provided at the left-hand forward corner of the vehicle, outside of one of the upright side walls 12 and forward of the adjacent front steering and drive wheel 17, as shown in Figure 1.

A cable reel indicated generally by reference character 25 is provided at the opposite side of the vehicle from said operator's platform on the outside of the side wall 12. Said cable reel has an electric cable 26 adapted to be wound thereon or be payed off therefrom in the usual manner, for supplying electric power to the vehicle when the free end of said cable is connected to a source of power.

The mechanism for driving each set of front and rear vehicle wheels 17 and 19 includes an electric motor 29 mounted on the outer side of each side wall 12. Each of said motors is herein shown as being a well known form of electric motor, and its mounting on said side wall and the drive therefrom to the respective front and rear vehicle wheels 17 and 19 is the same for each wheel and is clearly shown and described in my parent application Serial No. 597,547, now Patent Number 2,488,520 so need not herein be shown or described in detail.

The equalizing axle structures 18, 18 forming the novel features of my present invention each include worm and worm gear housings 30, 30 which form king pins or steering knuckles for the front steering wheels 17, 17 and are mounted on the side walls of the vehicle for floating movement in a vertical direction. Said gear housings are connected together adjacent their lower ends to move in opposite directions with respect to each other by a transverse equalizing bar 31, pivotally connected to the underside of the vehicle, for movement about a longitudinal axis parallel with the longitudinal center of said vehicle. Said equalizing axle structures are the same for each side of the vehicle so the equalizing axle structure on the right-hand side of the vehicle only need herein be shown and described in detail.

Figure 2:
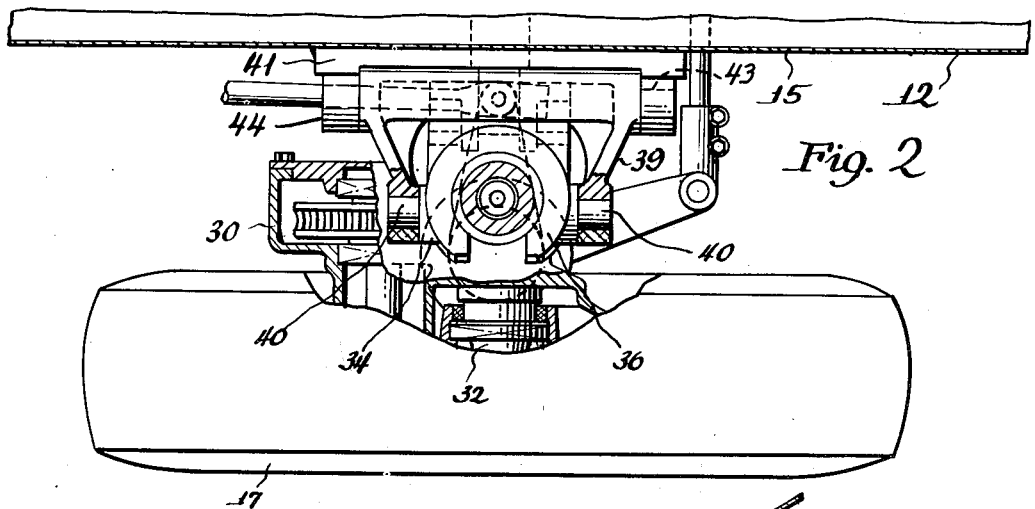
Figure 2 is an enlarged fragmentary plan view of one of the front vehicle wheels, with certain parts thereof broken away and certain other parts shown in horizontal section in order to show certain details of the support mounting and drive connection thereto.

The worm and worm gear housing 30 has an axle 32 extending outwardly therefrom and forming a dead axle for the front steering wheel 17 (see Figure 2). Said worm and worm gear housing forms a housing for the drive gearing for driving the front wheel 17 as is clearly shown and described in my parent application, so not herein shown or described in detail. Said housing is journaled adjacent its upper and lower ends in a floating support bracket 34, for pivotal movement about an axis inclined inwardly towards the side wall of the vehicle at an angle to provide the proper king pin angle, to lessen the resistance of the tires against the ground during turning of the wheels 17, 17 for steering.

The upper end of the worm and worm gear housing is journaled in the lower end of a gear housing 35, which is secured to a boss 36 by cap screws 37, 37. Said boss is open at its outer end and forms an upper outwardly projecting continuation of the floating support bracket 34. The lower end of said worm and worm gear housing is journaled for pivotal movement in a boss 38 which forms a lower outwardly projecting continuation of said floating support bracket.

A link in the form of a yoke 39 is provided to connect the upper end of the equalizing support bracket 34 to the side wall 12 for movement in a vertical direction. Said yoke is pivotally connected to said support bracket adjacent the forward end of the boss 36 on opposite sides of said boss on pivot pins 40, 40 projecting from opposite sides of said boss. The inner side of said yoke is pivotally connected to a reinforcing plate 41, herein shown as being welded to the outer side of the side wall 12. The pivotal connection between said yoke and said reinforcing plate includes a pair of pivot pins 43, 43 extending from opposite sides of said yoke and pivotally mounted in longitudinally spaced brackets 44, 44, secured to and projecting outwardly from said reinforcing plate. The outer left-hand end of the equalizing bar 31 extends within a slotted portion formed in the lower inner end of said floating support bracket and is pivotally connected thereto by means of a longitudinal pivotal pin 45. The opposite end of said equalizing bar is pivotally connected in a like manner to the opposite floating support bracket for the worm and worm gear housing 30 for the right-hand steering and drive wheel.

The yoke 39 pivotally connected to the reinforcing plate 41 at its inner side and having the gear housing 30 pivotally connected thereto for movement about an outwardly spaced axis parallel to the axis of the pivotal pins 43, 43, with the equalizing bar 31, forms a substantially parallel link support for said gear housing, mounting said gear housing on a side wall of the vehicle for vertical movement in a substantially straight line path.

The equalizing bar 31 extends between the upper and lower runs of the conveyor 21, so as to lend to the compactness of the machine and to provide an equalizing connection for the track wheels without increasing the height of the machine or reducing its clearance with the ground. Said bar is herein shown as being of a substantially triangular formation to lend rigidity thereto. The apex of the triangle forming said bar extends along the longitudinal center line of the vehicle, as shown in Figure 1. A pivot pin 46 is herein shown as being formed integrally with and extending forwardly from the apex of the triangle forming said bar. Said pivot pin is journaled in a support bracket 47 mounted on the underside of the bottom plate for the upper run of the conveyor and depending therefrom. A similar coaxial pivot 49 extends rearwardly from the base of the triangle forming said equalizing bar, and is pivotally mounted in a bracket 50 secured to the underside of said bottom plate. The axes of said pivot pins 46 and 49 are coaxial and are parallel with the longitudinal axis of the vehicle and mount said equalizing bar for pivotal movement about a longitudinal axis extending through the center of the vehicle between the upper and lower runs of the conveyor. Thus when the vehicle is traveling over a rough bottom and one front wheel rides into a depression, the opposite front wheel will be moved in an upward direction in a substantially straight line path by said equalizing bar, and vice versa when one front wheel engages a rise in the ground. The two front wheels are thus held in engagement with the ground where rough and uneven, enabling the vehicle to readily travel over an uneven mine bottom and minimizing twisting of the vehicle frame, and still providing relatively smooth riding qualities for the vehicle, without the use of springs.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. An equalizing mounting particularly adapted for a shuttle car having laterally spaced vertical side walls with an endless conveyor extending therebetween, a pair of wheels, and means for mounting said wheels on said side walls for vertical movement with respect thereto including a transverse equalizing bar pivotally mounted between the upper and lower runs of said conveyor for pivotal movement about an axis extending along the longitudinal center of said conveyor, a pair of wheel supporting brackets extending upwardly along the outer sides of said side walls, pivotal connections between opposite ends of said transverse bar and the lower ends of said brackets, and supporting connections between said side walls and said brackets including a separate link pivotally connecting each of said brackets with a corresponding side wall to cause said wheels to move vertically in a substantially straight line path upon rocking movement of said equalizing bar.

2. An equalizing mounting particularly adapted for a shuttle car having laterally spaced vertical side walls with an endless conveyor extending therebetween, a pair of driving and steering wheels; and means for mounting said wheels on said side walls for vertical movement with respect thereto including a transverse equalizing bar pivotally mounted between the upper and lower runs of said conveyor for pivotal movement about an axis extending along the longitudinal center of said conveyor; a pair of wheel supporting brackets extending upwardly along the outer sides of said side walls; a gear housing pivotally mounted in each of said brackets and including an axle for one of said wheels extending therefrom; said housing also forming a king pin for mounting said wheel on said side wall for steering; pivotal connections at opposite ends of said transverse equalizing bar and joining each end of said bar with the lower end of a corresponding bracket; and supporting connections between each of said brackets and a corresponding side wall; each of said supporting connections including a separate link pivotally connected at its outer end with one of said brackets and at its inner end with its corresponding side wall and forming with the equalizing bar a substantially parallel link support for its corresponding bracket, to cause said wheels to move vertically in a substantially straight line path upon rocking movement of said transverse equalizing bar.

3. An equalizing mounting particularly adapted for a shuttle car having laterally spaced vertical side walls with a bottom plate connecting said side walls together, a pair of driving and steering wheels; and means for mounting said wheels on said side walls for vertical movement with respect thereto including a rigid transverse equalizing bar mounted beneath said bottom plate for pivotal movement about an axis extending along the longitudinal center of said car; a pair of wheel supporting brackets extending upwardly along the outer sides of said side walls; a gear housing pivotally mounted in each of said brackets and having reduction gearing for driving an associated wheel and a drive shaft therefor carried thereby, and a dead axle for one said associated wheel extending from said housing; said gear housing also forming a king pin for mounting said wheel on said side wall for steering; pivot pins pivotally connecting each end of said transverse equalizing bar with the lower end of a corresponding bracket; and supporting connections between each of said brackets and a corresponding side wall; each of said supporting connections including a separate link pivotally connected at its outer end with one of said brackets and at its inner end with a corresponding side wall of said shuttle car and forming with said equalizing bar a substantially parallel link support for its corresponding bracket, to cause said wheels to move vertically in a substantially straight line path upon rocking movement of said transverse equalizing bar.

WILLIAM R. BECK.

REFERENCES CITED

The following references are of record in the file of this patent:

UNITED STATES PATENTS

| Number | Name | Date |
|---|---|---|
| 1,797,578 | Hoffman | Mar. 24, 1931 |
| 1,826,113 | Winsor | Oct. 6, 1931 |
| 1,883,357 | Fageol | Oct. 18, 1932 |
| 2,336,386 | Beck | Dec. 7, 1943 |
| 2,395,333 | Lee | Feb. 19, 1946 |
| 2,435,814 | Allison | Feb. 10, 1948 |

FOREIGN PATENTS

| Number | Country | Date |
|---|---|---|
| 2,642 | Great Britain | Dec. 8, 1904 |
| 434,330 | Great Britain | Aug. 29, 1935 |
| 520,465 | Great Britain | Apr. 24, 1940 |